H. B. ROBBINS.
Tire-Tightener.

No. 159,219. Patented Jan. 26, 1875.

Witnesses:
L. Grover
Chas. P. Brown

Inventor:
H. B. Robbins
Per Otto L. Johnson
Atty.

UNITED STATES PATENT OFFICE.

HIRAM B. ROBBINS, OF TEKONSHA, MICHIGAN.

IMPROVEMENT IN TIRE-TIGHTENERS.

Specification forming part of Letters Patent No. 159,219, dated January 26, 1875; application filed December 26, 1874.

*To all whom it may concern:*

Be it known that I, HIRAM B. ROBBINS, of the village of Tekonsha, Calhoun county, State of Michigan, have invented an Improved Felly-Tightener, of which the following is a specification:

This invention relates to an attachment for vehicle-wheels; and is designed to compensate for the swelling or shrinkage of the wheels, so that the rim may be contracted or expanded whenever required to cause the rim to fit the tire snugly, thereby avoiding the necessity of cutting and rewelding the tire, as is usually done when the tire becomes loose.

Figure 1:
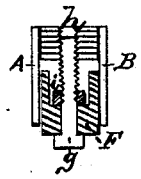
Figure 2:
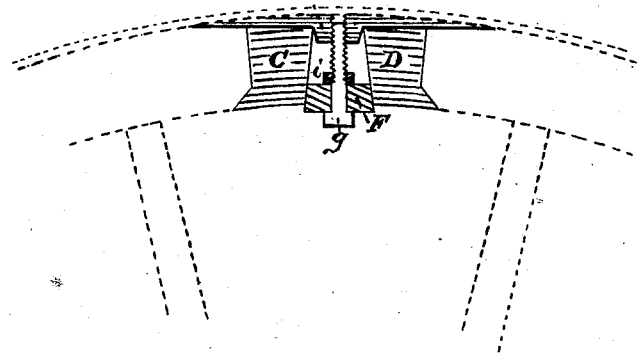

In the drawing, Figure 1 is a central longitudinal section, and Fig. 2 is a cross-section through the tap-bolt.

Similar letters of reference indicate like parts in both figures.

A B represent the sides, and C D the ends, of a metallic box fitted in the rim of the wheel, one of the ends, D, being movable, and both being beveled on the inside to fit the tapering sides of an adjustable wedge-shaped head, F, which works between them. $g$ is a tap-bolt, passing loosely through the head F, and into a lug cast on and near the center of the plate $h$, which covers and fits within said box. The bolt $g$ has a rim or washer, $i$, rigidly attached thereto, and is arranged on the inner side of the wedge F, the object of which is such that the bolt $g$ cannot be worked loose from the wedge F by the constant jarring of the several parts when the wheel is in motion.

I usually place two of these boxes in the rim of each wheel, and they are prevented from being lifted out or moved sidewise by the ends of the fellies being properly shaped to enter a groove or recess cast in the outside of the ends C D. These grooves are usually V-shaped, but may be made in any other suitable form.

Having thus described my invention, what I claim as new, and desire to secure by Letters Patent, is—

A metallic box, composed of the sides A B, stationary end C, and sliding end D, in combination with the adjustable wedge F, tap-bolt $g$, provided with the rim $i$ and plate $h$, to operate in the manner and for the purpose herein described and set forth.

To the above specification of my invention I have signed my name this 26th day of October, A. D. 1874.

HIRAM B. ROBBINS.

Witnesses:
A. S. SWIFT,
A. J. FRIDAY.